United States Patent [19]

Dickens

[11] Patent Number: 5,560,142
[45] Date of Patent: Oct. 1, 1996

[54] FLY-TIE FISHING LURE EYE ASSEMBLY

[76] Inventor: Stuart M. Dickens, 56 Elmwood Dr., North Kingstown, R.I. 02852

[21] Appl. No.: 530,953

[22] Filed: Sep. 20, 1995

Related U.S. Application Data

[63] Continuation-in-part of Ser. No. 367,076, Dec. 30, 1994, Pat. No. 5,456,040.

[51] Int. Cl.⁶ ........................................... A01K 85/08
[52] U.S. Cl. .............................. 43/42.34; 43/42.25
[58] Field of Search .............................. 43/42.39, 42.32, 43/42.25, 42.34, 42.37; D22/128, 132, 144

[56] References Cited

U.S. PATENT DOCUMENTS

| | | | |
|---|---|---|---|
| 1,723,557 | 8/1929 | Ono . | |
| 1,941,370 | 12/1933 | Vann | 43/46 |
| 1,967,692 | 7/1934 | Walker | 46/40 |
| 2,268,541 | 1/1942 | Arbogast | 43/42 |
| 2,611,206 | 9/1952 | Harvey | 43/42.24 |
| 2,733,535 | 2/1956 | Rosen | 43/42.33 |
| 2,765,571 | 10/1956 | Sinclair | 43/42.34 |
| 3,343,296 | 9/1967 | Davis | 43/42.28 |
| 3,881,272 | 5/1975 | Parker | 43/42.34 |
| 3,909,974 | 10/1975 | Kent | 43/42.31 |
| 3,952,445 | 4/1976 | Liebert | 43/42.34 |
| 3,959,060 | 5/1976 | Jones | 156/245 |
| 4,163,337 | 8/1979 | Kress | 43/42.05 |
| 4,831,764 | 5/1989 | Jecevicus | 43/42.24 |
| 5,063,704 | 11/1991 | Phillips | 43/42.25 |

*Primary Examiner*—J. Elpel
*Attorney, Agent, or Firm*—Barlow & Barlow, Ltd.

[57] ABSTRACT

An eye assembly for a fly-tie fishing lure is disclosed. A pair of eye sockets are provided with a central mounting rod connecting the two sockets together. Each socket includes an eye socket barrel having a convex free surface with a groove pattern therein and a relief pattern thereon for receipt of epoxy eyeball simulating material. The relief pattern may be a bead, star, cross or the like. The eye sockets with relief pattern greatly improves the adhesion of the epoxy of the eyeball material to each socket. As a result, the eyeballs are resistant to popping off and do not chip after excessive use.

12 Claims, 3 Drawing Sheets

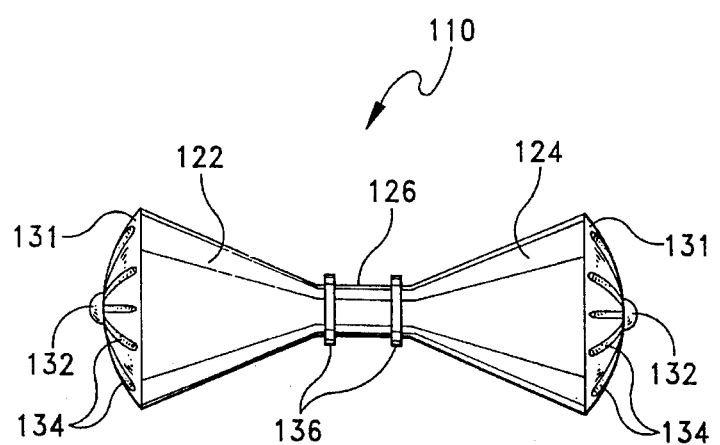
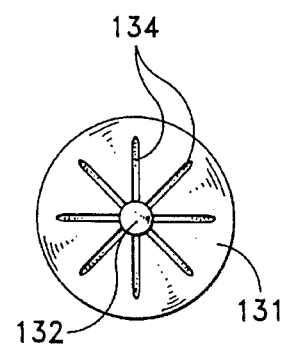
FIG. 13     FIG. 14
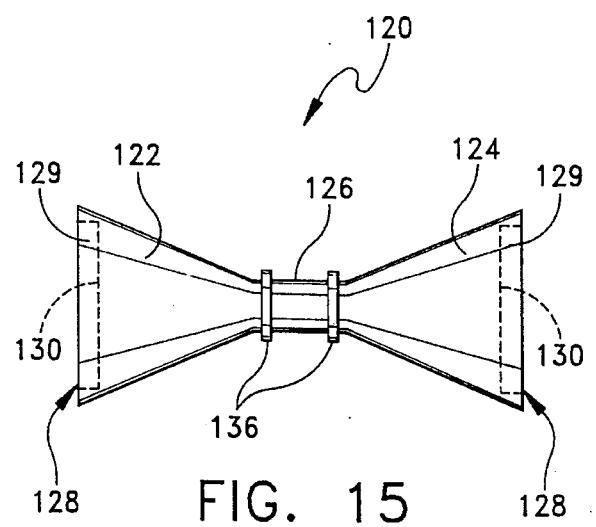
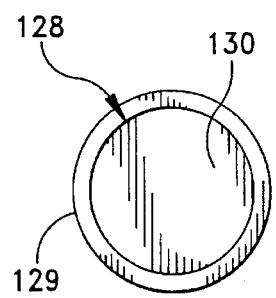
FIG. 15     FIG. 16

FLY-TIE FISHING LURE EYE ASSEMBLY

BACKGROUND OF THE INVENTION

This application is a continuation-in-part of patent application Ser. No. 08/367,076 filed Dec. 30, 1994, now U.S. Pat. No. 5,456,040.

The present invention relates generally to FLY-TIE FISHING LURES. More specifically, the present invention relates to a fishing lure eye assembly to be tied into a fly-tie lure assembly to simulate the eyes of the bait.

In the sport of fly-tie fishing, it has been well known to employ an eye assembly tied into the lure to simulate the eyes of the bait, such as an insect. Typically, these eye assemblies are tied by hand into the fishing lure.

However, prior art eye assemblies do not result in a realistic pair of eyes for the bait. As a result, the overall realism of the fly-tie is diminished resulting in an inferior bait, which in turn, affects the ability of the user to catch fish. Prior art eye assemblies typically include a central bar with a pair of hemispherical members on each end, respectfully. The rounded portions of the hemispheres connect with the central bar while the flat portions of the hemispheres point outward and away from the central bar. During the tying of the fly-tie, the person tying the fly-tie incorporates the eye assembly into the entire lure by tying string or the like around the central bar to leave the hemispherical eyes exposed. The flat, exposed surfaces of the hemispherical eyes are then painted with the appropriate coloring to simulate an iris and pupil on each eye. However, the flat surface of the exposed portion of the hemispherical eye is not realistic or a good simulation of actual bait eyes.

In fact, bait eyes are more realistic if they have a spherical or bulging configuration. In the prior art, attempts have been made to provide an outer eye surface of a spherical or rounded shape to more closely simulate the eyes of a bait. However, this attempt in the prior art to provide a more realistic bait eye has in common with the flat bait eye in that the surface of the exposed portions of the eye are simply painted with the appropriate colors to represent a pupil and an iris.

The drawback in these prior art eye assemblies is that the exposed surfaces are simply painted. As a result, the painted markings for the eye features easily chip or grind off even only after a few uses. In the event a thicker, more viscous, paint is employed on the surface on the exposed eye, the volume of paint tends to easily pop off. As a result, the realism of the lure degrades quickly due to the inferior eye assemblies known in the prior art.

Due to the demand for a fly-tying eye assembly which resists wear, it is desirous for a person who employs fly-ties to be able to incorporate an eye assembly into their lures which will maintain its realism and resist wear over many times of usage.

SUMMARY OF THE INVENTION

The present invention preserves the advantages of prior art fishing lure eye assemblies. In addition, it provides new advantages not found in currently available fishing lure eye assemblies, and overcomes many of the disadvantages of such currently available assemblies.

The invention is generally directed to a novel and unique fishing lure eye assembly with particular application in fly-tie fishing lures. The fly-tie fishing lure eye assembly of the present invention enables realistic bait eyes to be easily sewn or tied into fly-tie lures where the realism of the eye may be maintained notwithstanding significant use over time.

The preferred embodiment of the present invention includes a central mounting rod having a first end and a second end. Two cup-shaped eye sockets are provided on each end o of the mounting rod with the open ends of the sockets facing away from one another. A relief pattern of material is provided in each cup on its inner surface. In the alternative, a raised, convex socket with a relief pattern thereon and/or a groove pattern therein may be provided. The relief pattern may be a bead or a star configuration, for example. Eyeball simulating material, such as epoxy, is disposed in each of the eye sockets and overflowing therefrom to form a bulging mass of eyeball simulating material. The eyeball simulating material preferably includes two colors to simulate both the iris and pupil of the eyes of a bait. As a result of the cup configuration of the eye sockets with a relief pattern on the floor of the cups, the eyeball simulating material, such as epoxy, adheres permanently to the sockets resisting wear and prevents reduction of the realism of the eye assembly. Two ribs may also be provided on the central mounting rod for additional security and centering of wire tied thereto.

It is therefore an object of the present invention to provide a fly-tie fishing lure eye assembly which resists wear.

Another object of the present invention is to provide a fly-tie fishing lure eye assembly that maintains its realism over long periods of time and use.

It is a further object of the present invention to provide a fly-tie or fly-tie fishing lure eye assembly which closely simulates the eyes of a bait by providing realistic bulging eyes.

It is yet a further object of the present invention to provide a fly-tie fishing lure eye assembly which includes a bulging eye structure yet resists being popped off from the main eye assembly.

BRIEF DESCRIPTION OF THE DRAWINGS

The novel features which are characteristic of the present invention are set forth in the appended claims. However, the inventions preferred embodiments, together with further objects and attendant advantages, will be best understood by reference to the following detailed description taken in connection with the accompanying drawings in which:

FIG. 13 is a front view of an alternative embodiment of the present invention showing convex eye sockets carrying a relief and groove pattern.

FIG. 14 is a side view of the alternative embodiment shown in FIG. 13.

FIG. 15 is a front view of another alternative embodiment of the present invention with conical-shaped eye socket barrels with depressions therein.

FIG. 16 is a side view of the alternative embodiment shown in FIG. 15.

DETAILED DESCRIPTION OF THE PREFERRED EMBODIMENT

Figure 1:
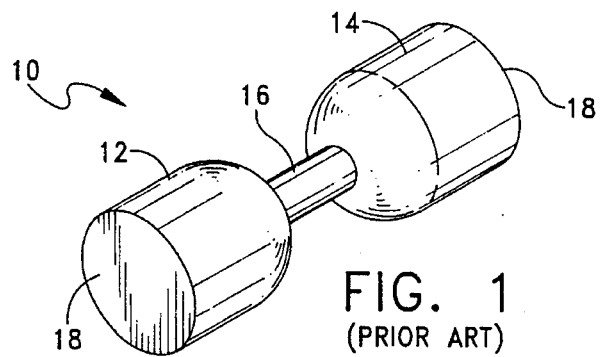
FIG. 1 is a perspective view of a fly-tie fishing lure eye assembly of the prior art.

Referring to FIG. 1, a prior art fly-tie lure eye assembly before painting is shown. This prior art eye assembly includes a left barrel and fight barrel 14 and a connector bar 16 disposed therebetween to connect the two barrels together. Both the left barrel 12 and the right barrel 14 include an exposed face on their ends to receive paint thereon to simulate a pair of eyes of a bait. As shown in FIG. 1, exposed face 18 on both the barrel ends is typically flat but may also be slightly convex. When the eyes are painted on exposed faces 18, the paint in the prior art assembly easily chips off due to the flat surface 18 which quickly results in an inferior and less realistic pair of bait eyes. In the prior art assembly 10, the exposed faces 18 are completely inadequate for receiving eyeball simulating material, such as paint.

Figure 2:
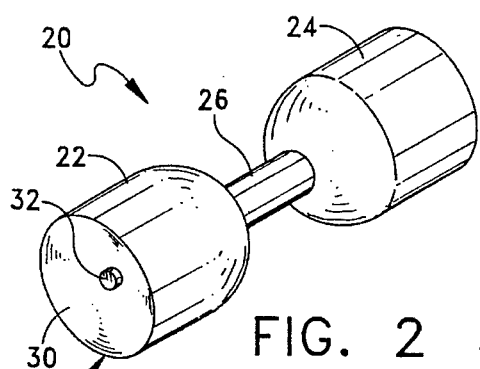
FIG. 2 is a perspective view of a fly-tie fishing lure eye assembly of the present invention before application of eyeball material.
Figure 3:
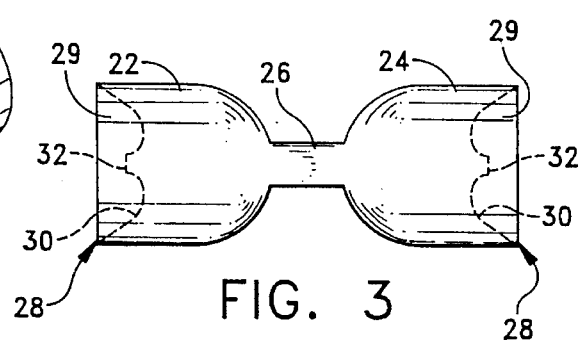
FIG. 3 is a front view of the eye assembly of FIG. 2 showing the cup-shaped eye sockets.

Turning now to FIG. 2, a fly-tie fishing lure eye assembly 20 of the present invention is shown before application of the eyeball material and referenced generally as 20. In this preferred embodiment of the present invention, the eye assembly 20 includes a left eye socket 22 and a right eye socket 24 with a central mounting rod 26 disposed therebetween. At the opposing ends of the left eye socket 22 and right eye socket 24 are formed a cup portion 29 with a floor 30 which extends below the lip 28 of both the left eye socket 22 and right eye socket 24. With reference to both FIGS. 2 and 3, a relief pattern 32 is provided on the floor 30 of the cup portion 29 of both the left and right eye sockets 22 and 24. In the preferred embodiment, the relief pattern 32 is a bead of material identical to the material in which the entire eye assembly 20 is manufactured. In fact, the relief pattern 32, such as a bead, is preferably formed directly into the entire casting mold for the eye assembly 20 of the present invention. As can be seen in FIG. 3, which is a front view of the eye assembly 20 of the present invention which indicates the depth of the cup portions of both the left eye socket 22 and right eye socket 24, floor 30 of the cup portion 29 extends into an eye socket below the lip 28 of each socket to provide a volume within each socket to receive eye simulating material, as will be discussed in detail below.

Figure 4:
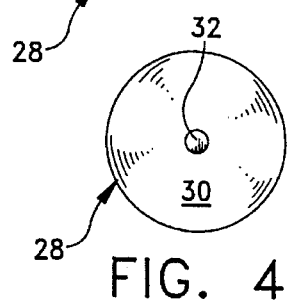
FIG. 4 is a side view of a preferred embodiment of the present invention shown in FIG. 2.
Figure 5:
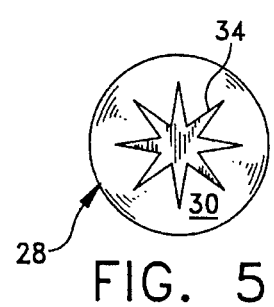
FIG. 5 is a side view of an alternative embodiment of the present invention shown in FIG. 2.
Figure 6:
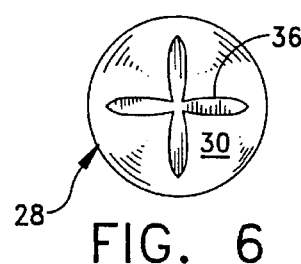
FIG. 6 is a side view of an alternative embodiment of the present invention shown in FIG. 2.
Figure 7:
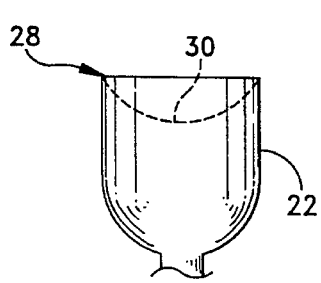
FIG. 7 is a front view of an alternative embodiment of the eye assembly of FIG. 2 showing a cup-shaped eye socket.
Figure 8:
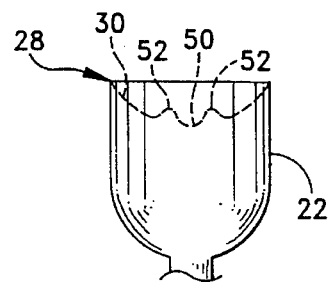
FIG. 8 is a front view of an alternative embodiment of the eye assembly of FIG. 2 showing a cup-shaped eye socket with center depression.
Figure 9:
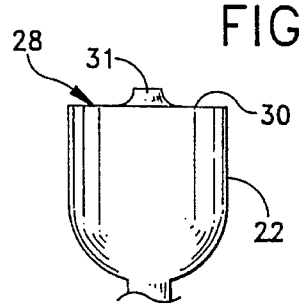
FIG. 9 is a front view of an alternative embodiment of the eye assembly of FIG. 2 showing a socket with a raised pin surface.
Figure 10:
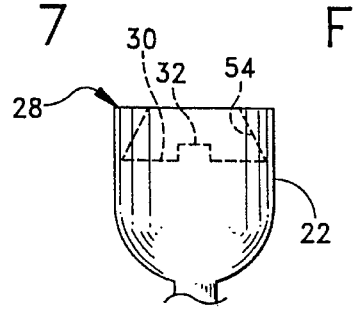
FIG. 10 is a front view of an alternative embodiment of the eye assembly of FIG. 2 showing a cup-shaped eye socket with a beveled-in wall and bead relief pattern.
Figure 11:
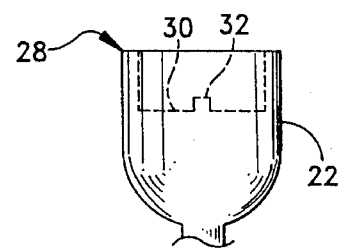
FIG. 11 is a front view of an alternative embodiment of the eye assembly of FIG. 2 showing a cup-shaped eye socket with a straight wall and bead relief pattern.

FIG. 4 shows a side view of the eye assembly 20 of the present invention where the configuration of the relief pattern 32 can easily be seen. In FIG. 4, the preferred relief pattern 32 is shown where a bead of material is formed on the floor 30 of both left eye socket 22 and right eye socket 24. As discussed above, bead 32 is easily formed and cast preferably integral to the eye assembly structure 20. FIGS. 5 and 6 show alternative embodiments of the relief pattern present on the floor 30 on both the eye sockets. For example, FIG. 5 illustrates a star pattern 34 present on floor 30 within the cup portion 29 of a socket. Similarly, FIG. 6 shows another alternative embodiment of the present invention where alternative relief pattern 36 is provided in the shape of a cross pattern on floor 30 within an eye socket of the present invention. It should be understood that modifications to these patterns may be realized and are within the scope of the present invention. For example, as seen in FIGS. 7 through 11, other patterns, such as a circular or square pattern, may also be employed. FIG. 7 shows a socket 22 with floor 30 and raised lip 28. FIG. 8 shows a floor 30 with central depression 50 and circular ridge 52. FIG. 9 shows a flat floor 30 with a raised pin 31. FIG. 10 shows a flat floor 30 with a bead 32 and beveled-in wall 54. Also, FIG. 11 shows straight walls and bead 32. Further, while a relief pattern is preferred, a patterned trough may be formed in floor 30 of each socket.

In the alternative, FIGS. 13–16 show two further alternative embodiments of the present invention. FIG. 13 shows a front view of an alternative embodiment of the eye assembly 110 of the present invention. The eye assembly 110 includes a left eye socket barrel 122 and a right eye socket barrel 124 with a central mounting rod 126 disposed therebetween. Barrels 122 and 124 are substantially conical in shape to further provide an alternative eye socket shape. At opposing free ends of the left eye socket barrel 122 and right eye socket barrel 124 are formed convex surfaces 13 1 with a groove pattern 134 therein and a relief pattern 132 in the form of a bead of material. FIG. 14 shows a side view of alternative embodiment 110 where a groove pattern 134 and relief pattern 132 is shown. Various other groove patterns such as the star or cross patterns shown in FIGS. 5 and 6, patterns, and relief patterns may be employed in an on convex surfaces 131. The eye assembly 110 of FIGS. 13 and 14 is similar to the embodiment illustrated in FIG. 9 with the addition of a convex receiving surface, a groove pattern therein and a relief pattern thereon.

As will be described in detail below, the eye assembly 110 of the present invention is tied into a completed fly-tie fishing lure. To facilitate the retention of assembly 110 in the completed fishing lure assembly, ribs 136 are provided about the circumference of central mounting rod 126. Such ribs 136 may be cast directly with central mounting rod 126 and barrels 122 and 124 for ease of manufacture. As a result, ribs 136 serve to contain and align wire wrapped around central mounting rod 126 during the fly-tying procedure.

Referring to FIG. 15, a front view of another alternative embodiment of the present invention is shown. Left eye socket barrel 122 is connected to right eye socket barrel 124 by a central mounting rod 126 which carries a pair of ribs 136 positioned about the circumference of the central mounting rod 126. In alternative embodiment eye assembly 120, the free ends of the left eye socket barrel 122 and right eye socket barrel 124 include a cup portion 129 with a floor 130 for receipt of eyeball simulating material therein. FIG. 16 illustrates a side view of the assembly 120 of FIG. 15 illustrating the cup-like structure for receiving eyeball simulating material.

Figure 12:
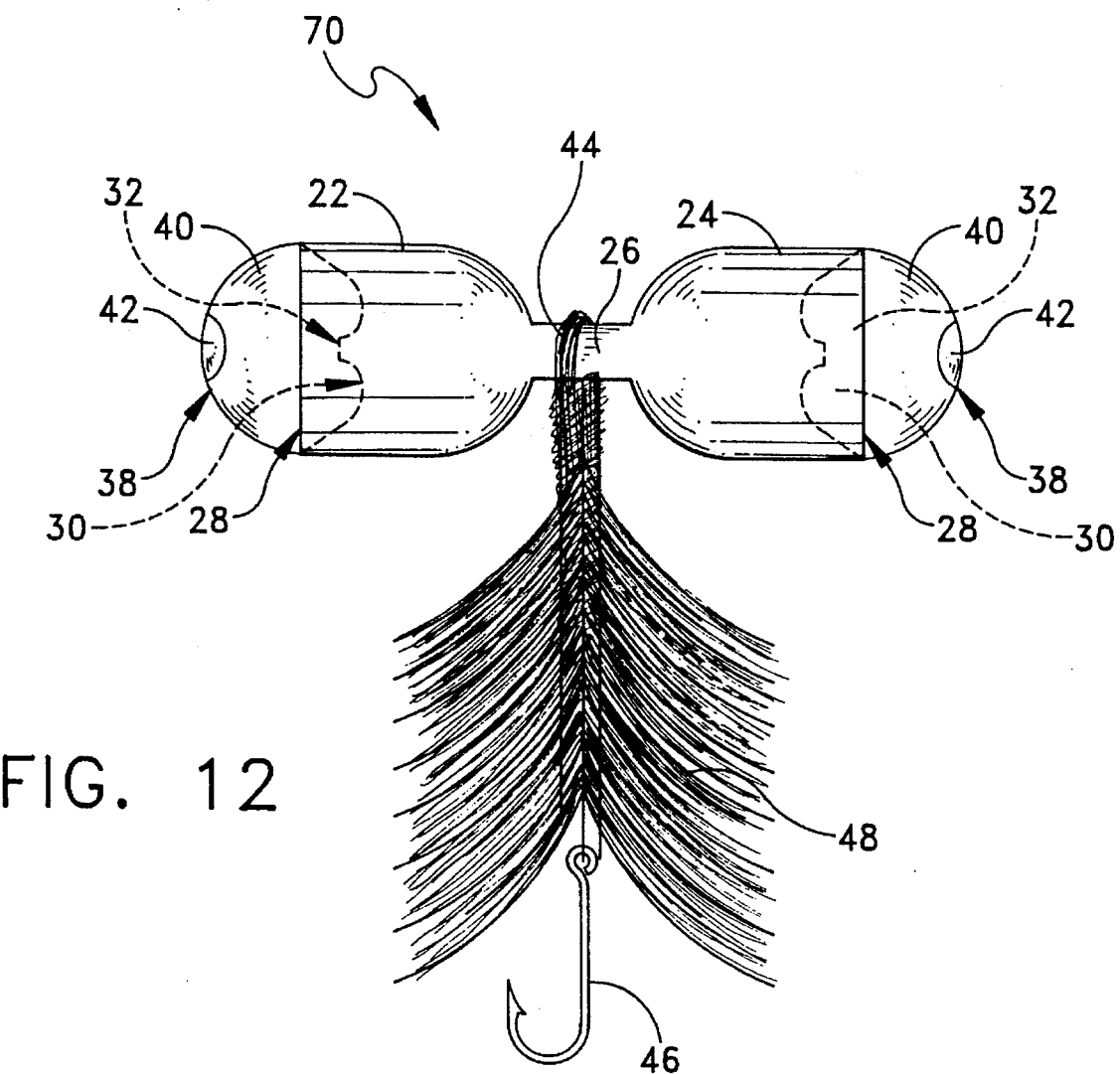
FIG. 12 is a top view of a fully assembled fly-tie bait employing the eye assembly of the present invention.

Turning now to FIG. 12, a completed fly-tie fishing lure 70 employing the eye assembly 20 of the present invention is shown. As can be seen, left eye socket 22 and right eye socket 24 are connected to one another by central mounting rod 26 therebetween. A volume of eyeball simulating material, preferably epoxy, is disposed both within the cup shaped portions 29 of each eye socket as well as beyond the lip 28 of each socket. As indicated by the dotted lines in FIG. 12, eyeball 38 of epoxy material is received by the cup shape portion 29 of both the left eye socket 22 and right eye socket 24 on the floor 30 of each cup portion 29 of each socket. The positioning of relief pattern 32 on the floor 30 of each socket helps maintain epoxy eyeball 38 within each respective eye socket. The result is an improved bonding between epoxy eyeball 38 and each eye socket. As a result, a volume of epoxy in excess of the volume of the cup portion of each socket may be applied to reach each respective eye socket to ensure that a large portion of each epoxy eyeball 38 extends beyond lip 28 to closely simulate a protruding and bulging bait eyeball. Further, eyeball 38 may employ epoxy of two different colors, one for iris 40 and another color for pupil 42. A similar process is employed for the alternative embodiments shown in FIGS. 13–16.

As can also be seen in FIG. 12, completed eye assembly 70, with eyeballs 38 intact can be successfully tied into and incorporated into a completed fly-tied lure. For example, the completed eye assembly 70 is tied via strings or wire 44 about central mounting rod 26 in a conventional manner known in the art. Further, decorative members 48 are also provided to further enhance the simulation of a bait. In addition, hook 46 is also provided to complete the final fly-tied lure as known in the art.

In view of the environmental concerns relating to lead, the left eye socket 22, the right eye socket 24, and central mounting rod 26 are preferably integrally formed from a single mold using a spin cast method and manufactured from a lead substitute preferably comprising 96% tin, 3.5% antimony with the remainder being copper. Additionally, a pewter-like material may be employed for those members as well. The eyeball 38, to be disposed in each of the eye sockets, is preferably made of epoxy, but may be other such materials such as paint. These processes are also applied to the alternative embodiments of FIGS. 13–16.

Further, the dimensions and sizing of the eye assembly of the present invention, including the alternative embodiments, are similar to those available of the prior art so that fly-ties will have the same size eye assemblies available to them as before with the prior art. However, the present invention is superior to the prior art eye assemblies in that they more realistically simulate bait eyes and are not susceptible to chipping or being popped off and secure the tying wire better to the central mounting rod. Moreover, the eye assemblies of the present invention may be easily formed of different colors in accordance with the color of epoxy employed.

It would be appreciated by those skilled in the art that various changes and modifications can be made to the illustrated embodiments without departing from the spirit of the present invention. All such modifications and changes are intended to be covered by the appended claims.

What is claimed is:

1. An eye assembly for a fly-tie fishing lure, said eye assembly comprising:

a central mounting rod having a first end and a second end;

a first eye socket having a closed end and a convex mounting surface with a outer edge opposite said closed end said closed end of said first eye socket being connected to said first end of said central mounting rod;

a second eye socket having a closed end and a convex mounting surface with an outer edge opposite said closed end; said closed end of said second eye socket being connected to said second end of said central mounting rod;

a bead of material affixed on said convex mounting surface of said first eye socket;

a bead of material affixed on said convex mounting surface of said second eye socket;

a pattern of at least one groove disposed in said convex mounting surface of said first eye socket;

a pattern of at least one groove disposed in said convex mounting surface of said second eye socket; and eyeball simulating material disposed on said first eye socket and on said second eye socket on said convex mounting surface of said first eye socket and said second eye socket; said eyeball simulating material extending beyond the outer edge of the first eye socket and beyond the second eye socket to provide a bulging eyeball at the extremities of the eye assembly.

2. The eye assembly of claim 1, wherein said eyeball simulating material is epoxy.

3. The eye assembly of claim 1, wherein said eyeball simulating material is paint.

4. The eye assembly of claim 1, wherein said central mounting rod, said first eye socket and said second eye socket are manufactured of metal.

5. The eye assembly of claim 1, wherein said central mounting rod, said first eye socket and said second eye socket are manufactured of an alloy containing, by weight, 96% tin, 3.5% antimony and the remainder being copper.

6. The eye assembly of claim 1, wherein said eyeball simulating material is of two colors to simulate the iris and pupil of a fish eye.

7. The eye assembly of claim 1, wherein said eye sockets are substantially conical in shape.

8. The eye assembly of claim 1, further comprising:

a pair of ribs disposed on said mounting rod; said ribs being disposed around the circumference of said mounting rod and being parallel to one another.

9. The eye assembly of claim 1, wherein said pattern of at least one groove on said first and second eye sockets is a star pattern of grooves.

10. The eye assembly of claim 1, wherein said pattern of at least one groove on said first and second eye socket is a cross pattern of grooves.

11. An eye assembly for a fly-tie fishing lure, said eye assembly comprising:

a laterally disposed mounting bar;

a pair of eye sockets, each having convex mounting surfaces, connected to the extremities of said mounting bar with mounting surfaces of said eye sockets facing away from said mounting bar;

a relief bead formed on each of said mounting surfaces;

a groove pattern disposed in said mounting surfaces; and epoxy material positioned on the convex mounting surfaces of said sockets; said epoxy extending from said sockets to form bulging eyes.

12. An eye assembly for a fly-tie fishing lure, said eye assembly comprising:

a laterally disposed mounting bar;

a pair of conical shaped eye sockets connected to the extremities of said mounting bar with open ends of said eye sockets facing away from said mounting bar;

a pair of ribs disposed on said mounting rod; said ribs being disposed around the circumference of said mounting rod and being substantially parallel to one another; and epoxy material positioned in each of the open ends of said sockets; said epoxy overflowing from said open ends to form bulging eyes.

* * * * *